United States Patent [19]  [11] Patent Number: 4,576,476
Marshall, II et al. [45] Date of Patent: Mar. 18, 1986

[54] METHOD AND SYSTEM FOR ACCURATELY MEASURING SPEED OF A SHIP RELATIVE TO A BODY OF WATER

[75] Inventors: Hubert T. Marshall, II, Fishkill; Eugene W. Vest, Wappingers Falls; Frederick J. Villforth, III, Fishkill, all of N.Y.

[73] Assignee: Texaco, Inc., White Plains, N.Y.

[21] Appl. No.: 489,994

[22] Filed: Apr. 29, 1983

[51] Int. Cl.$^4$ .......................... G01P 3/36; G01C 21/00
[52] U.S. Cl. ......................................... 356/28; 73/181
[58] Field of Search ...................... 356/28, 27; 73/181; 367/89; 343/8, 5 BD

[56] References Cited

U.S. PATENT DOCUMENTS 3,664,748  5/1972  Bezu ..................................... 356/152
3,690,767  9/1972  Missio et al. ..................... 343/5 BD Primary Examiner—S. C. Buczinski
Assistant Examiner—Linda J. Wallace
Attorney, Agent, or Firm—Robert A. Kulason; Henry C. Dearborn

[57] ABSTRACT

A method and system for measuring relative speed of a ship through a body of water with improved accuracy and simplicity. It employs a free floating buoy and a pair of tracking scopes. The buoy is launched and tracked by the scopes with electronic circuit arrangements so that the time of relative movement of the buoy between transverse positions opposite the scopes is accurately measured.

3 Claims, 6 Drawing Figures

METHOD AND SYSTEM FOR ACCURATELY MEASURING SPEED OF A SHIP RELATIVE TO A BODY OF WATER

FIELD OF THE INVENTION

The invention concerns a method and system for improved accuracy in measuring the speed of a ship relative to the body of water through which it travels.

BACKGROUND OF THE INVENTION

Various techniques for making measurements of a ship's speed through the water have been used over the years by mariners. However, the known techniques have either lacked sufficient accuracy to evaluate a hulls efficiency, or they have required undesirable instrumentation installations on the ship.

It is an object of this invention to provide a means of accurately determining the speed of a ship through the water which makes use of accurate instrumentation that does not require extensive shipboard installation.

Some of the prior techniques which have been employed have made use of a Doppler type speedometer which has the drawback of being subject to difficulties with surface water effects. Another technique has made use of Pitot tubes, but that has relatively poor accuracy. And, it is subject to changes in the indications with a ships trim.

Consequently, it is another object of this invention to provide for a method and system that is accurate and yet simple to carry out. It employs a free floating buoy and uses a pair of tracking scopes. Relative movement of the buoy and ship are accurately measured over a known distance, with the time of travel being electronically measured and so having high accuracy.

BRIEF SUMMARY OF THE INVENTION

Briefly, the invention relates to a method of measuring the speed of a ship relative to a body of water through which said ship is being propelled. It comprises the steps of launching a free floating buoy near the front of the ship, and tracking said buoy from two locations spaced apart a predetermined distance along the length of said ship. It also comprises timing the relative movement of said buoy from the beginning to the end of said predetermined distance, the said speed being determined by dividing said predetermined distance by said time of the relative movement.

Again briefly, the invention concerns a system for accurately measuring the speed of a ship relative to a body of water through which it is propelled, in order to determine propulsion efficiency. The system comprises in combination a free floating buoy, and a pair of scopes for tracking said buoy. It also comprises means for mounting said scopes spaced a predetermined distance apart along the length of said ship, and timing means. It also comprises means associated with said scopes for actuating said timing means to measure the time interval of said ship required to travel through said body of water said predetermined distance.

Once more briefly, the invention concerns a system for accurately measuring the speed of a ship relative to a body of water through which it is propelled, in order to determine propulsion efficiency. It comprises in combination a free floating buoy, and a pair of scopes for tracking said buoy. It also comprises means for mounting said scopes spaced a predetermined distance apart along a line parallel with the center line of said ship, and electronic timing means having inputs for starting and stopping a timing interval. It also comprises means associated with said scopes for actuating said timing means to measure the time interval required by said ship to travel said predetermined distance relative to said buoy. The said last named means comprises a shutter actuated by the azimuth angle of each of said scopes, and photoelectric circuit means cooperating with each said shutter for developing a signal at an azimuth angle transverse to the center line of said ship. The last named means also comprises electronic circuit means comprising a relay for selecting one of said electronic timing means inputs, and an electronic latch having inputs for receiving said photoelectric circuit signals and an output for actuating said relay.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

Figure 1:
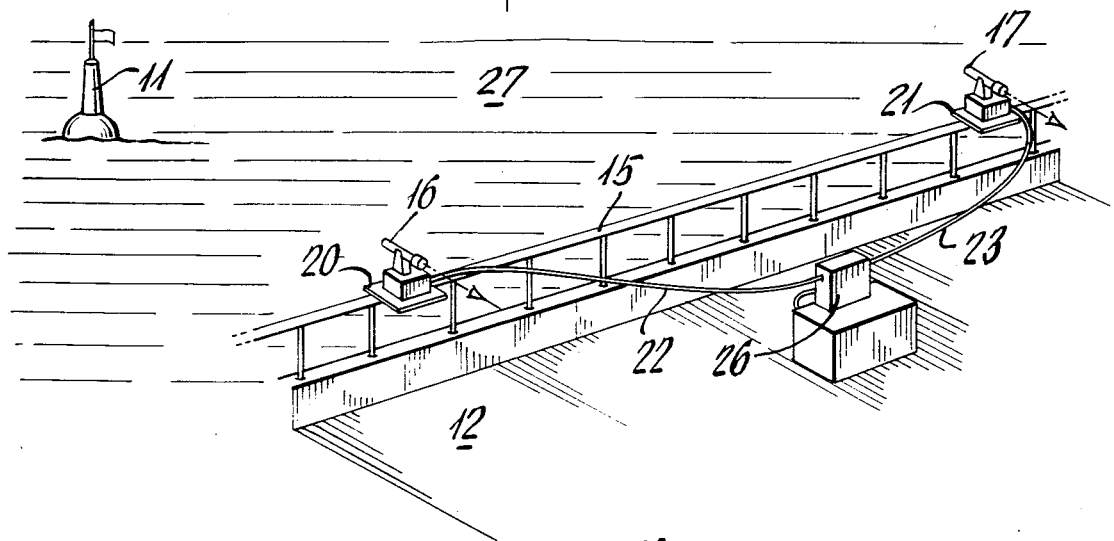
FIG. 1 is a schematic isometric showing of a portion of the deck of a ship and a pair of scopes mounted along the rail, plus a free floating buoy in the body of water nearby.

The technique employed may be understood with reference to the FIG. 1 schematic illustration. Thus, there is a marker buoy 11 that is launched in any feasible manner onto the surface of a body of water 27 so as to be a free floating marker buoy. This buoy 11 is thrown from the bow of the ship as it is underway through the water, and it appears to move toward the stern. The illustration shows in a schematic manner a portion 12 of the deck of a ship which is having its speed relative to the water 27, measured. The ship has a railing 15 along one edge of the deck 12 and there are a pair of tracking scopes 16 and 17. These scopes are mounted in any featible manner such as by having a base plate 20 and 21, respectively, attached securely to the railing 15. There are electrical cables 22 and 23 which connect the scopes 16 and 17, respectively, to a timer 26.

The method basically involves measuring the speed of the ship (deck 12) through the body of water 27, upon and through which the ship is being propelled. It involves the steps of first launching the free floating buoy 11 from or near the bow of the ship, and then tracking the buoy from two locations e.g. the platforms 20 and 21 illustrated. The tracking locations are spaced apart a predetermined distance along the length of the ship. The method includes a step of timing the relative movement of the buoy 11 from the beginning to the end of the predetermined distance which may be accurately measured on the ship. Then the speed is determined by dividing that known distance by the time of the relative movement of the buoy 11.

Figure 2:
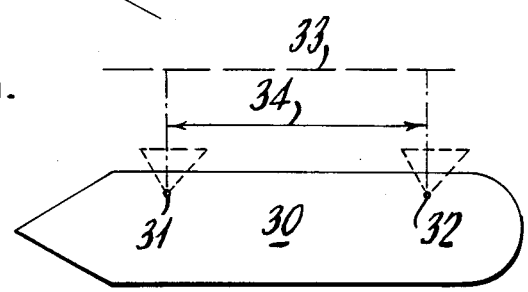
FIG. 2 is a schematic illustration of a ship along with diagramatic indications of the scope locations and the relative path of movement of a free floating buoy.

It will be understood that in order for the distance of relative movement by the free floating buoy 11 to be the same as the known distance between the sighting scopes, the beginning and ending of the time interval being measured must be at the same azimuth angle for each of the scopes. Preferably such azimuth angle is 90° relative to the center line of the ship. FIG. 2 schematically indicates these conditions. Thus, there is shown a ship 30 with a bow scope location 31 and a stern scope location 32. The relative path of travel of the buoy is indicated by a dashed line 33, and it will be appreciated that the tracking of the buoy will start prior to its reaching the 90° azimuth angle position. However, the time measurement will be started at that precise angle. Thereafter, the timer will continue to run until the other scope at location 32 reaches its 90° azimuth angle. Then the time measurement will be stopped. Thus, a predetermined distance 34 will have been traveled by the ship 30, and the time required for the buoy to move along the relative path 33 will be the same as the time it takes for the ship to travel that distance.

Figure 3:
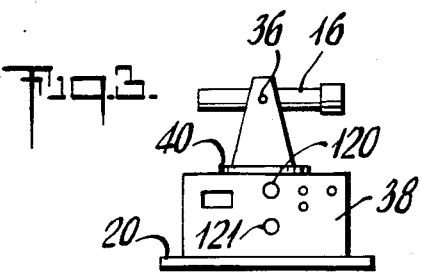
FIG. 3 is a side elevation schematic illustrating a bow scope with instrumentation according to the invention.
Figure 4:
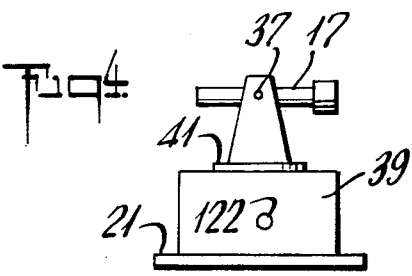
FIG. 4 is another side elevation schematic of a scope which would be located at the stern of a ship.

It will be understood that each of the scopes 16 and 17 (schematically illustrated somewhat enlarged in FIGS. 3 and 4) have crosshairs (not shown) therein in a conventional manner. Consequently, the tracking of the buoy 11 may be accurately carried out. Also, it will be appreciated that the scopes 16 and 17 are mounted on horizontal pivots 36 and 37 respectively so that the elevation angle may be adjusted while carrying out the tracking procedure. In addition, each scope 16 and 17 is mounted on a circular plate or disc 40 and 41 respectively for rotation about a vertical axis. The entire mounting for each includes an enclosed base portion 38 and 39 respectively.

Figure 5:
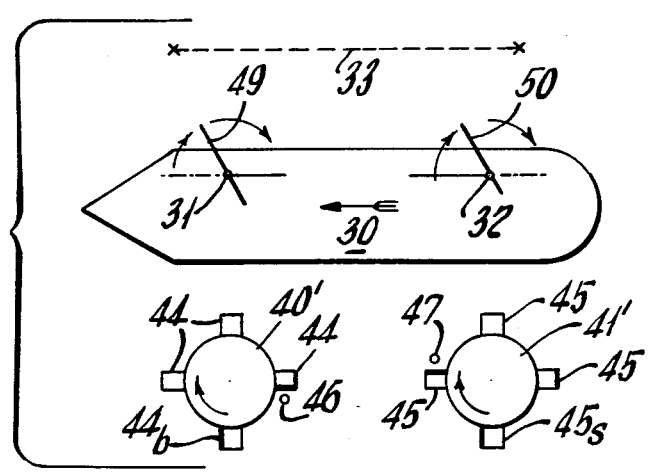
FIG. 5 is a composite schematic, indicating the ship plus scope locations and a pair of shutters for the purpose of explaining the action in taking a time interval measurement as the scopes are employed in the tracking procedure.

FIG. 5 is a schematic like FIG. 2 but with added plan view schematics of discs 40' and 41' which rotate in azimuth with the scopes. These discs 40' and 41' are mounted inside the bases 38 and 39 respectively and are attached to common shafts (not shown) which are situated vertically so as to create the vertical axes about which the discs 40, 41 and scopes 16 and 17 respectively, may rotate. Each disk 40' and 41' has four tabs 44 and 45 respectively, to act as shutters for a photoelectric circuit arrangement e.g. that illustrated in FIG. 6. And in this manner one of the tabs of each disc is used to measure a particular azimuth angle as each scope is rotated. A photo cell 46 and 47 is located relative to one of the tabs 44 and 45 respectively so that the azimuth angle for starting and stopping the time interval measurements, may be accurately determined as the scopes are rotated during the tracking operation. This may be explained in connection with the rest of the schematic showing in FIG. 5. The ship 30 has scope locations 31 and 32 indicated plus the path 33 representing the relative travel of the buoy 11.

It will be understood that all of the tabs 44 and 45 are located at 90° apart around the peripheries of the discs 40' and 41'. And, after ensuring that the scope locations 31 and 32 are on a line parallel to the center line of the ship 30, the line of sight of both scopes may be accurately aligned by sighting each scope on the other followed by clamping them in that position while the discs 40' and 41' are adjusted so that one of the tabs 44 and likewise one of the tabs 45 respectively, has its leading edge (clockwise rotation) ready to actuate the photocell 46 and 47, in each case. Then the discs 40' and 41' will be secured for rotation with the respective scopes and the tab $44_b$ will have its leading edge (heavy line) ready to actuate the photocell 46 when the bow scope reaches the 90° azimuth angle, as it tracks beginning from a position 49. Similarly the stern scope's tab $45_s$ will have its leading edge (heavy line) ready to actuate the other photocell 47 when that scope reaches its 90° azimuth angle, as it tracks beginning from a position 50.

As indicated by the foregoing, it will be understood that the various arrows in FIG. 5 illustrates the action as the scope 16 (location 31) is trained upon the buoy 11 to start tracking it with the azimuth angle (position 49) toward the bow. At the same time the tab $44_b$ will be in the upper right hand quadrant. Then as the forward scope 16 reaches its 90° azimuth position the tab $44_b$ will reach the photocell 46 and act as a shutter to trigger the start of a timing interval. Thereafter, the stern scope 17 (location 32) will have commenced its tracking with its azimuth angle (position 50) also toward the bow, but with its tab $45_s$ in the lower left hand quadrant. Then as the stern scope reaches its 90° azimuth position the tab $45_s$ will reach the photocell 47 and act as a shutter to trigger the stop time of the interval measurement.

Figure 6:
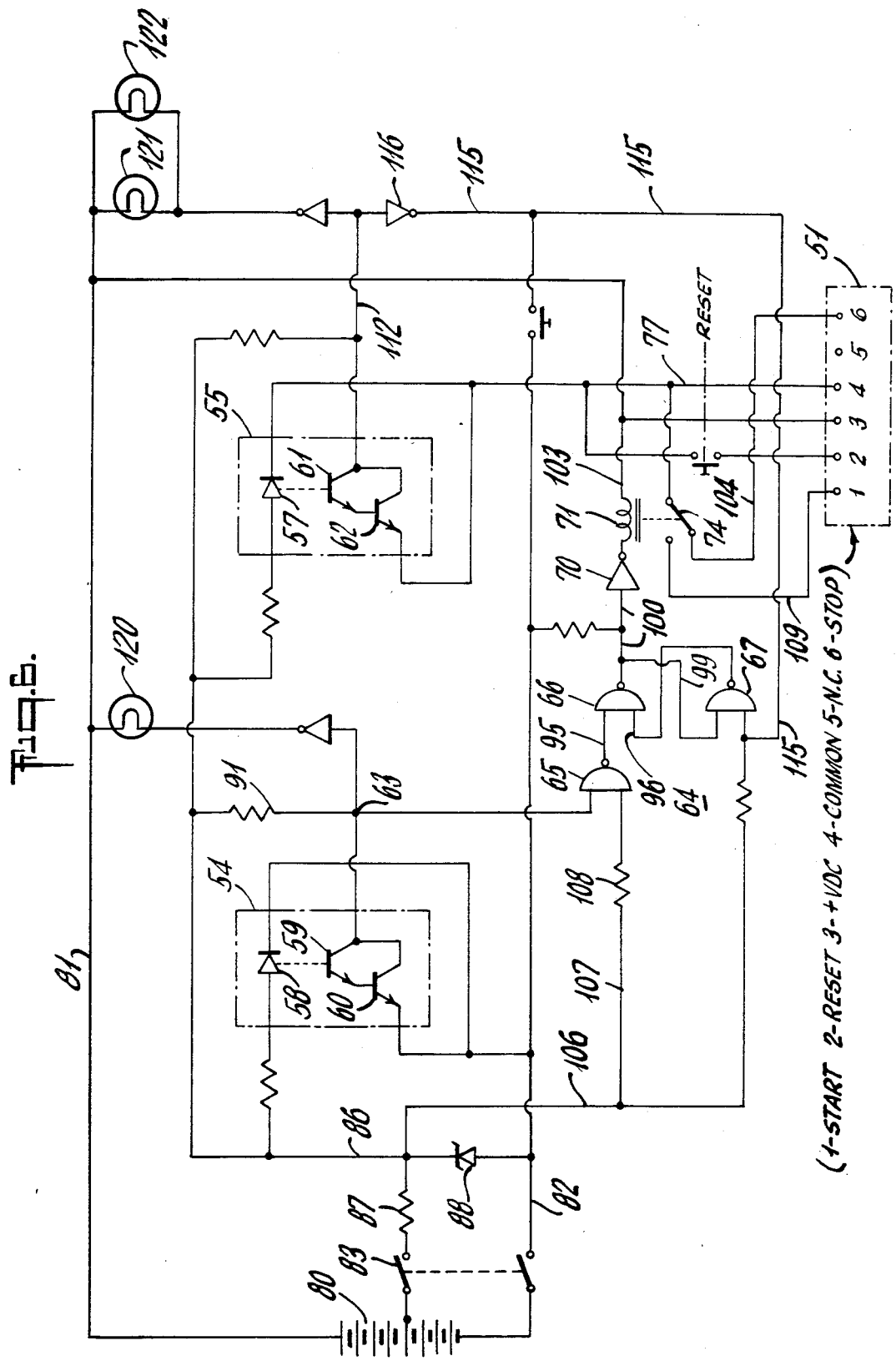
FIG. 6 is a schematic circuit diagram illustrating the electronic circuit system that may be employed in the tracking and timing procedure according to the invention.

It will be understood that particular elements and equipment could be employed, which might differ from one another. But, a preferable circuit showing elements that have been used in carrying out a procedure according to the invention, are illustrated in FIG. 6. Also, while various timers might be used that could be triggered by the photo cells 46 and 47 (FIG. 5), a preferable arrangement is illustrated in FIG. 6. It is adapted for use with an electronic counter 51 that is preferably a commercial digital elapsed time indicator, such as one manufactured by Veeder-Root which has a digital systems division at Hartford, Conn. 06102. Thus, the timer 51 may be a model 7971 Elapsed Time Indicator that is designed and manufactured by Veeder-Root Co. 70 Sargeant Street, Hartford, Conn. 06102. Such timer has a six terminal input connector as indicated at the dashed line enclosure (timer 51) in FIG. 6. These inputs control the functions indicated by the captions applied to the various numbered inputs. It may be noted that the timer 26 illustrated in FIG. 1 is a general indication and in the preferred embodiment specifically illustrated in FIG. 6, the timer 26 would include a number of the elements shown in the FIG. 6 circuit diagram.

FIG. 6 illustrates the circuit diagram for the preferred electronic and electrical system that includes part of the elements associated with the two tracking scopes 16 and 17. They are employed for initiating and terminating the time interval that is being measured in the manner described above in relation to the FIG. 5 diagram. There is a photo electric circuit unit 54 that is located in the base 38 of the scope 16 near the bow of the ship. There is another photo electric circuit unit 55 that is similarly located as part of the base 39 of the other scope 17 near the stern. It may be noted that both of these units 54 and 55 include a light source i.e. a light emitting diode 58 and 57 respectively, that directs its light beam onto a light sensitive transistor 59 and 61 respectively. The latter act in conjunction with another transistor 60 and 62 in each case, in a conventional manner, so as to conduct current through the joint path of transistors 59, 60 and 61, 62 when light is directed onto the transistors 59 and 61.

It will be appreciated that there are shutters (not shown) which are one of the tabs 44 and 45 respectively that will intercept the light beam between the light emitting diode 58 and its light sensitive transistor 59 in the unit 54, and between the other diode 57 and its transistor 61 in the unit 55.

When a shutter cuts off the light beam in the photo electric unit 54, it develops an output signal at a circuit point 63 and this signal goes into one input of a latch 64 that is an electronic circuit element made up of three Nand gates 65, 66, and 67. The latch 64 has an output that goes via an inverter 70 to control a relay 71. The relay 71 actuates a switch 74 that alternatively selects a circuit from the terminal 4 (common circuit connection 77) to either the circuit connected to terminal 6 (for stopping the timer) or to terminal 1 (for starting the timer). As indicated above, the numbered terminals 1-6 are inputs to an elapsed time indicator 51 which is schematically illustrated in FIG. 6 as a dashed line box.

The circuit of FIG. 6 includes a battery 80 that supplies a maximum positive voltage on a circuit connection 81 and has its negative terminal connected to a common or ground circuit connection 82 whenever a power switch 83 is closed. Switch 83 is a double pole single throw switch, and so it also closes an intermediate positive voltage circuit connection 86 via a resistor 87 and across a zener diode 88.

OPERATION

The action of the circuit connections illustrated in FIG. 6 may be followed in connection with a timing interval that is commenced when the bow scope 16 reaches its transverse position as the free floating buoy 11 is tracked. During he preliminary tracking, i.e. before the transverse position is reached, both of the photo electric circuit units 54 and 55 will be conducting and consequently the conditions at latch 64 may be traced as follows. Transistors 59 and 60 will be conducting and consequently point 63 will be at a low because of the voltage drop through a resistor 91. This low voltage is applied to one input of the Nand gate 65 via a circuit connection 92. Consequently the upper input connection 95 to Nand gate 66 will be at a high because of the inverting action of Nand gate 65. At the same time the other input connection 96 to the Nand gate 66 will also be at a high since connection 96 comes from the output of the third Nand gate 67. At this time the Nand gate 67 has the lower of its inputs at a high while its upper input is connected via a circuit connection 99 to the inverted output of Nand gate 66 which stands at a low. Connection 99 joins a circuit connection 100 that goes to an input of inverter 70, an output of which is therefore high so that the relay coil 71 is not energized. This is because the other end of the coil is connected to the positive voltage line 81 via a circuit connection 103. Therefore the switch 74 is in the position illustrated in FIG. 6, and the timing counter 51 is stopped by reason of a connection 104 via switch 74 to the terminal 6 of the counter 51.

When the shutter on the bow scope 16 acts in the photo electric circuit unit 54 to cut off the light beam between the LED 58 and transistor 59, the transistor circuit stops conducting and the point 63 goes high since the current no longer flows through resistor 91.

This creates a high at the upper input of Nand gate 65 which already has a high on its lower input by reason of a connection from intermediate voltage on the connection 86. That lower input connection goes via circuit connections 106, 107 and a resistor 108.

The foregoing action takes place at the instant when the bow scope 16 reaches its transverse azimuth angle so that a timing interval is commenced. This beginning signal (a high on circuit connection 92) shifts the inverted output on circuit connection 95 from a high to a low and consequently also shifts the output signal on the circuit connection 99 (from Nand gate 66) along with circuit connection 100, to a high. Therefore the relay 71 is actuated by reason of inverter 70 applying a low at its output which energizes the coil of relay 71 and causes the switch 74 to be shifted to the other position. This shifts the common circuit connection 77 from the terminal 6 to the terminal 1 via a circuit connection 109. The latch 64 then holds these conditions while the counter 51 runs and records the time during which the buoy 11 moves along its relative path toward the stern tracking scope 17.

When the stern unit 55 has its light beam cut off, the transistor 61 stops conducting and a circuit connection 112 goes high. This makes a circuit connection 115 low because of an inverter 116. When circuit connection 115 is low, the lower input to Nand gate 67 is low and the output on circuit connection 96 goes high which puts two highs on the inputs to Nand gate 66. The result makes its inverted output on circuit connection 100 go low, which is inverted by inverter 70 so that the relay coil 71 is deenergized by having both ends of the coil high. Consequently the switch 74 goes back to the position illustrated and the timer 51 is stopped.

It will be understood that the latter action which stops the timing interval takes place when the stern scope 17 reaches it transverse azimuth position. Then the accurate time interval will be used to divide the measured distance 34 (FIG. 2) by the time to determine the ship's speed through the body of water in a very accurate yet simplified manner.

It may be noted that once the bow scope 16 has triggered the timing interval, it should be left with its shutter tab 44 in the cut off position of the light beam in unit 54 (an indicator light 120 on) until after the stern scope 17 has triggered the stop time at the end of the interval (indicator lights 121 and 122 on). This is to avoid erroneous timing.

While particular embodiments of the invention have been described above in considerable detail in accordance with the applicable statutes, this is not to be taken as in any way limiting the invention but merely as being descriptive thereof.

We claim:

1. Method of measuring the speed of a ship relative to a body of water through which said ship is being propelled, comprising the steps of launching a free floating buoy near the front of said ship, tracking said buoy with sighting scopes from two locations spaced apart a predetermined distance along the length of said ship, said tracking comprising rotation said scopes in azimuth and in elevation while training them upon said buoy, timing the relative movement of said buoy from the beginning to the end of said predetermined distance, said step of timing comprising commencing a timed interval when the forward sighting scope has been rotated to reach a predetermined azimuth angle relative to the centerline of said ship, and terminating said timed interval when the after sighting scope has been rotated to reach said same predetermined azimuth angle, said speed being determined by dividing said predetermined distance by said time of the relative movements.

2. Method according to claim 1, wherein said predetermined azimuth angle is 90°.

3. In a system for accurately measuring the speed of a ship relative to a body of water through which it is propelled in order to determine propulsion efficiency, wherein said system comprises in combination a free floating buoy, a pair of scopes for tracking said buoy, and means for mounting said scopes spaced a predetermined distance apart along a line parallel with the center line of said ship, the improvement comprising said scopes having freedom of movement in both azimuth and elevation electronic timing means having two inputs one for starting and one for stopping a timing interval, and means associated with said scopes for actuating said timing means to measure the time interval of said ship to travel said predetermined distance relative to said buoy, said last named means, comprising a shutter actuated by a predetermined azimuth angle of each of said scopes while each of said scopes continuously tracks said buoy, photoelectric circuit means cooperating with each said shutter for developing a signal at an azimuth angle transverse to the center line of said ship, and electronic circuit means for actuating said electronic timing means, said electronic circuit means comprising a relay for selecting one of said electronic timing means inputs, and an electronic latch having inputs for receiving said photoelectric circuit signals and an output for actuating said relay whereby said relay selects said starting input when the first of said photoelectric circuit signals is developed and selects said stopping input when the other photoelectric circuit signal is developed.

* * * * *